April 7, 1942.                J. D. ALTEMUS                2,279,102
                              ELECTRIC RAZOR
                       Filed Oct. 25, 1939          5 Sheets-Sheet 1
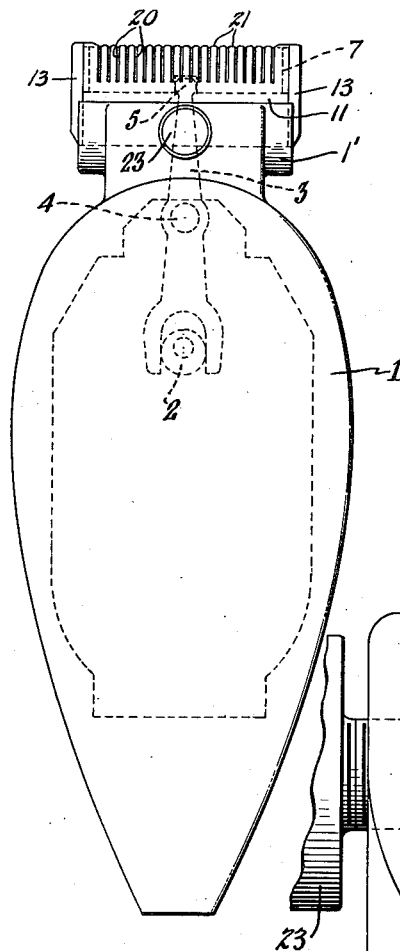
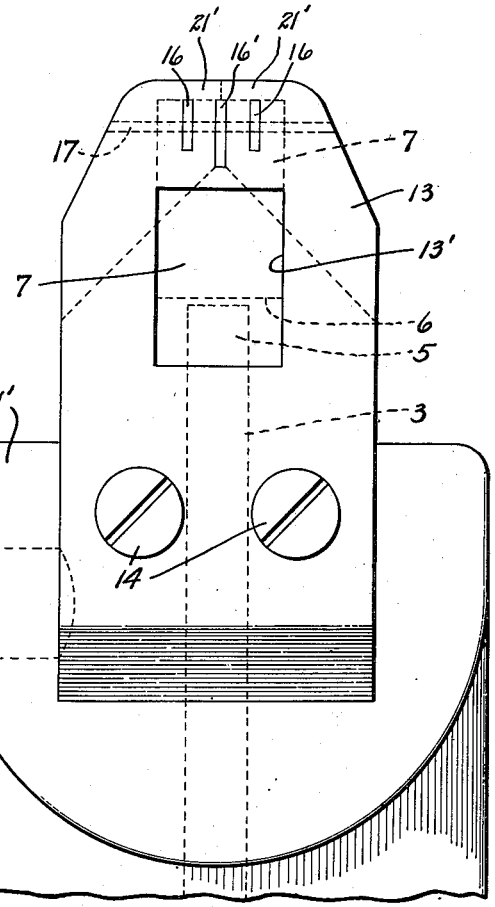
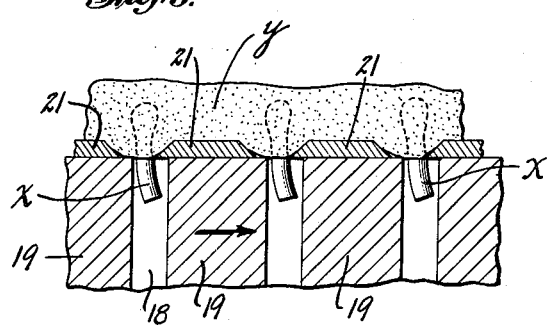
INVENTOR:
James Dobson Altemus,
BY
His ATTORNEY.

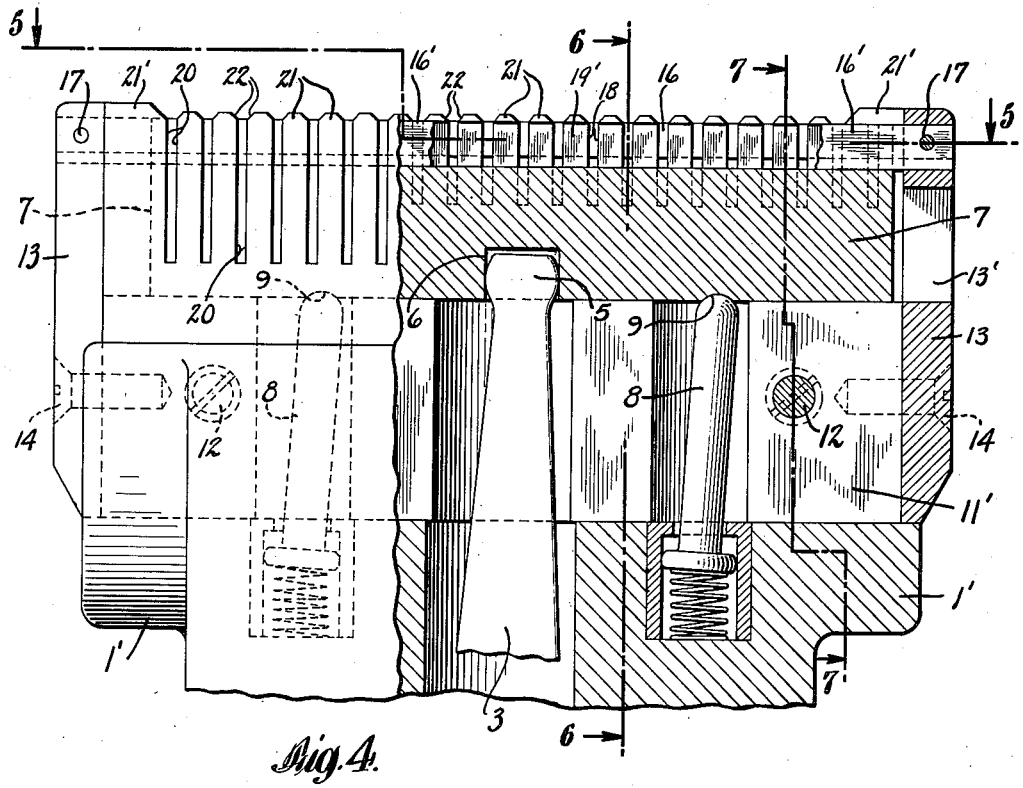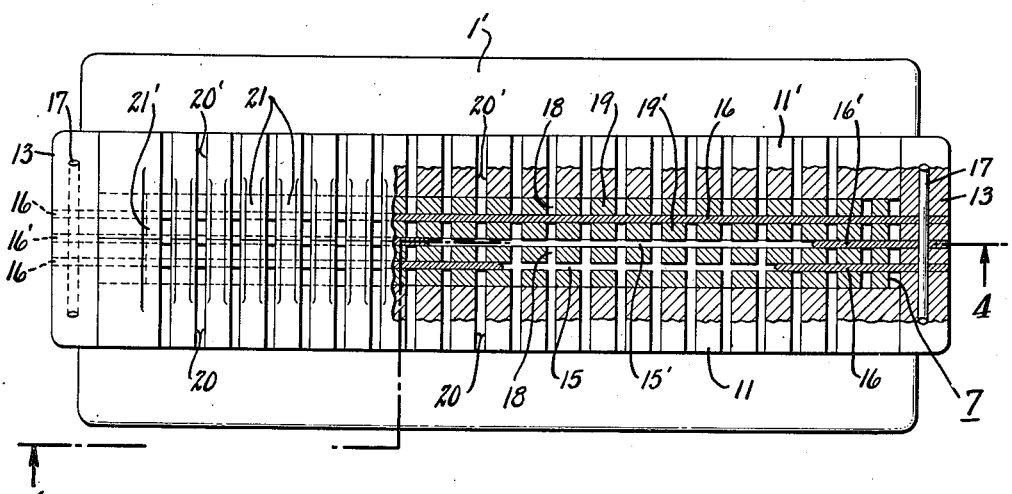

April 7, 1942.  J. D. ALTEMUS  2,279,102
ELECTRIC RAZOR
Filed Oct. 25, 1939     5 Sheets-Sheet 3
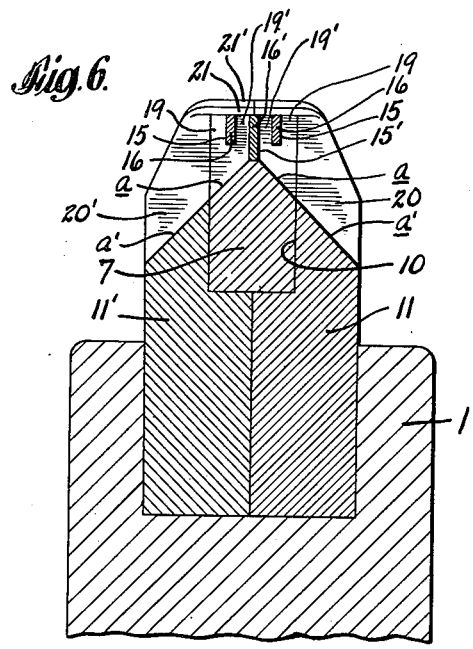
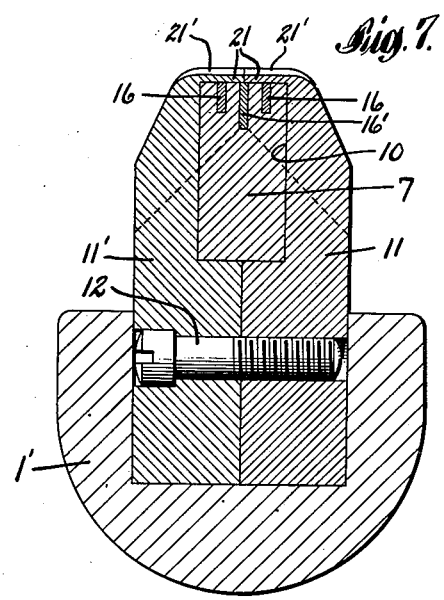
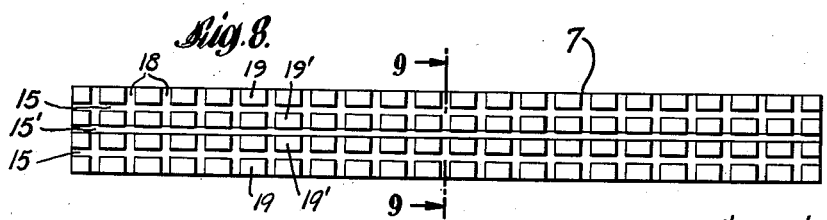
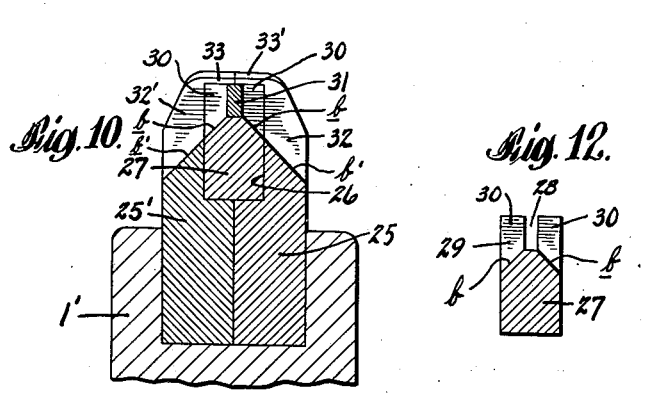
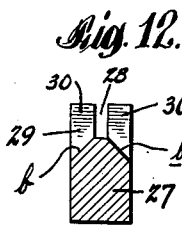
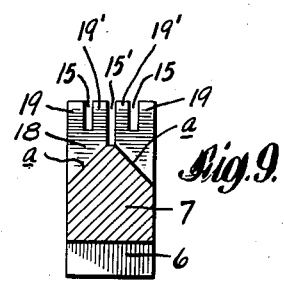
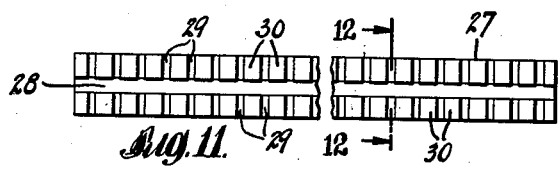
INVENTOR:
James Dobson Altemus,
BY
His ATTORNEY.

April 7, 1942. J. D. ALTEMUS 2,279,102
ELECTRIC RAZOR
Filed Oct. 25, 1939 5 Sheets-Sheet 4

INVENTOR:
James Dobson Altemus,
BY
His ATTORNEY.

April 7, 1942.  J. D. ALTEMUS  2,279,102
ELECTRIC RAZOR
Filed Oct. 25, 1939   5 Sheets-Sheet 5

INVENTOR:
James Dobson Altemus,
BY
ATTORNEY.

Patented Apr. 7, 1942

2,279,102

UNITED STATES PATENT OFFICE 2,279,102

ELECTRIC RAZOR

James Dobson Altemus, Roslyn, N. Y.

Application October 25, 1939, Serial No. 301,151

3 Claims. (Cl. 30—43)

This invention relates to electric shavers of the true razor type wherein the blade elements are so disposed that the shearing edges thereof are exposed so as to have substantially flush engagement with the skin during the shaving operation while at the same time the skin is prevented at all times from passing below the plane of such shearing edges thereby being protected at all times against laceration and injury. Other objects of the invention are the provision of an implement which is sturdy, compact, attractive in appearance and in which while the cutting elements are easily renewable, the same are capable of long service because of being essentially self-sharpening. Other advantages of the invention are hereinafter set forth.

In the accompanying drawings in which I have illustrated a preferred form of my invention Figure 1 is a front elevation and Fig. 2 an enlarged end elevation of an electric shaver or razor embodying my invention;

Fig. 3 is a fragmentary, detailed vertical section showing the manner in which the shaving head engages the skin during the shaving operation;

Fig. 4 is an enlarged longitudinal vertical section of the shaving head isolated, the same being taken on the line 4—4 of Fig. 5; and Fig. 5 is a longitudinal horizontal section taken on the line 5—5 of Fig. 4;

Figure 13:
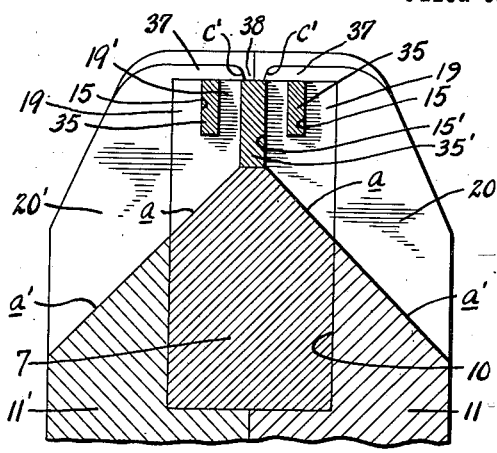
Figure 14:
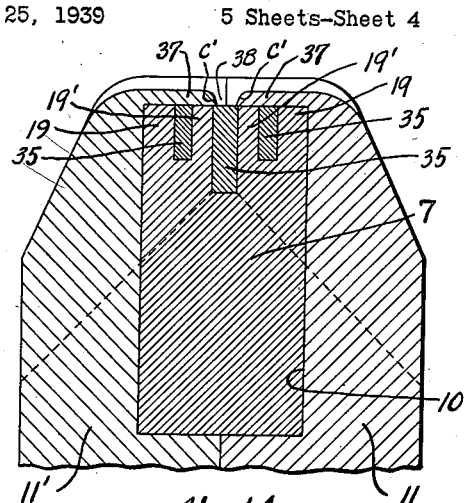
Figure 15:
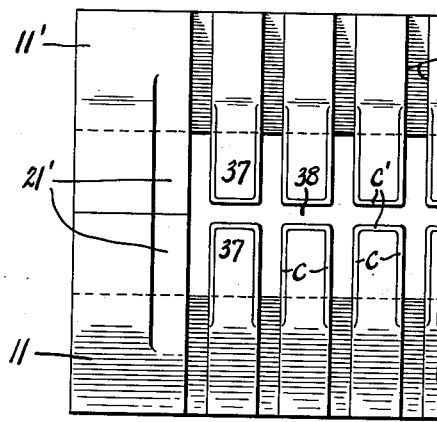
Figure 16:
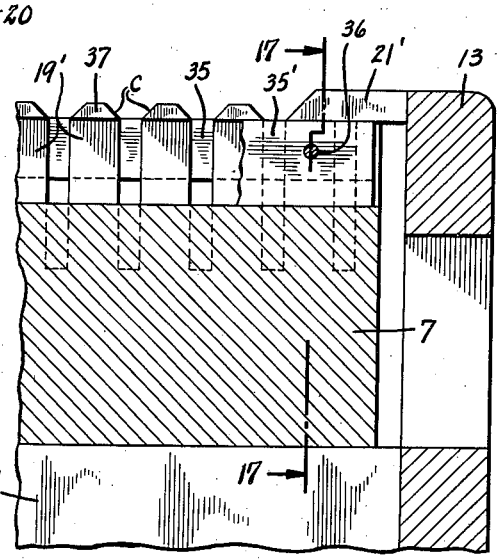
Figure 17:
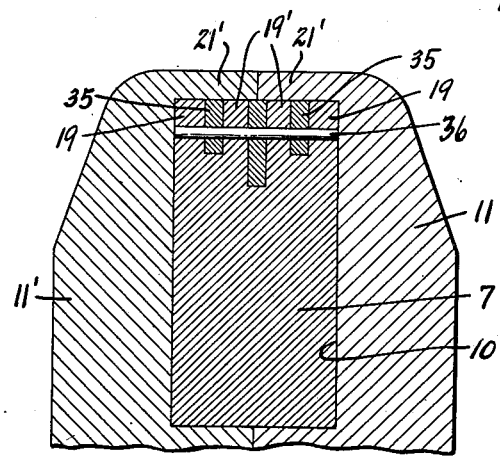
Figure 18:
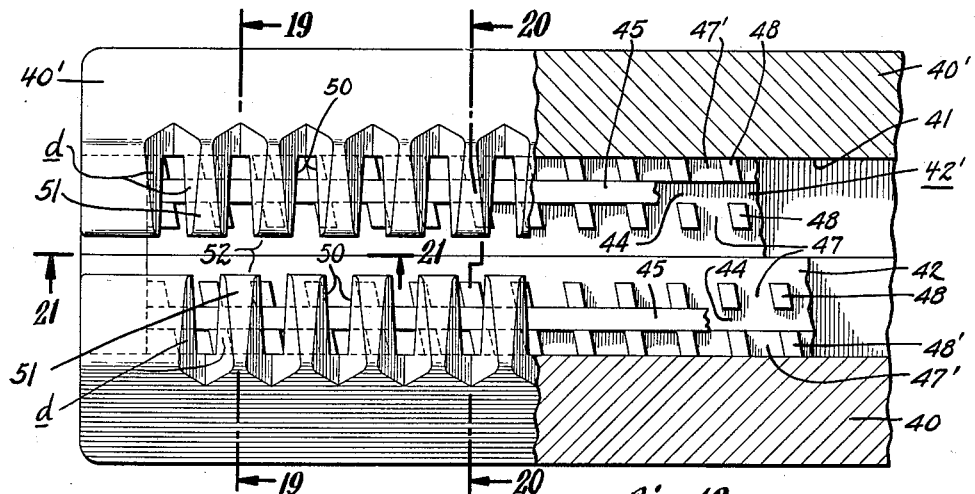
Figure 19:
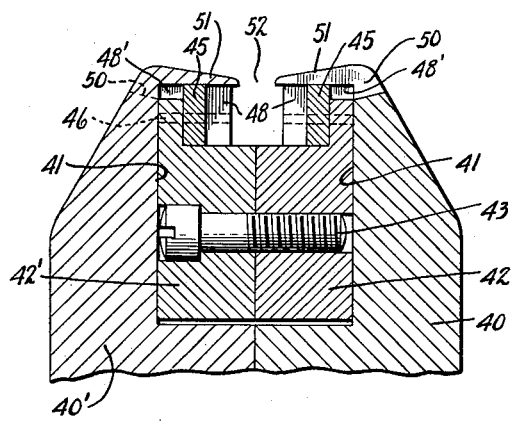
Figure 20:
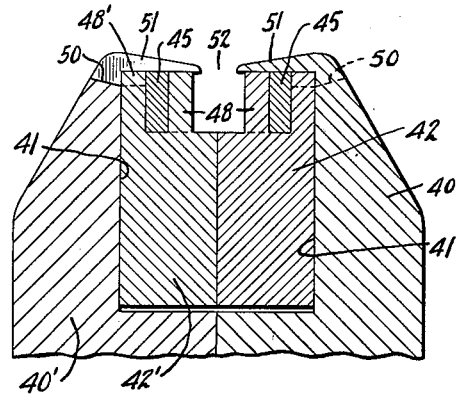
Figure 21:
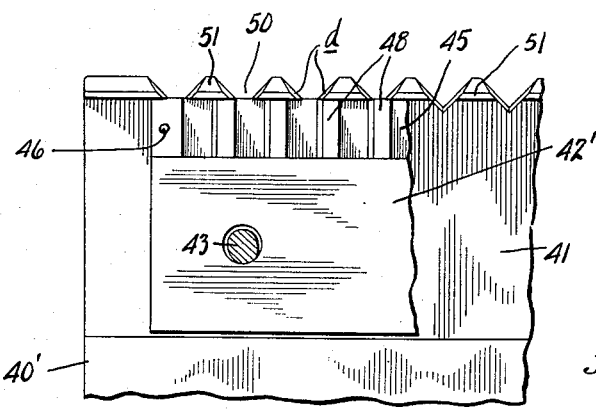

Figs. 6 and 7 are vertical sections taken on the line 6—6 and 7—7 respectively of Fig. 4;

Fig. 8 is a plan view of the movable cutter bar, isolated; and Fig. 9 is a vertical section on the line 9—9 of Fig. 8;

Fig. 10 is a fragmentary vertical section of a modified form of shaving head wherein but a single longitudinal guard bar is employed;

Fig. 11 is a plan view of the cutter bar shown in Fig. 10, isolated; and Fig. 12 is a vertical section taken on the line 12—12 of Fig. 11;

Figs. 13 and 14 are transverse vertical sections, respectively, corresponding to the views shown in Figs. 6 and 7, showing a still further modification wherein a longitudinal central hair-receiving slot is provided in the shaving head and the guard bars are secured in the movable cutter bar;

Fig. 15 is a fragmentary plan view and Fig. 16 a fragmentary longitudinal vertical section, taken slightly to one side of the center, of the shaving head shown in Fig. 13;

Fig. 17 is a fragmentary transverse vertical section taken on the line 17—17 of Fig. 16;

Fig. 18 is a plan view, partly in horizontal section, of a still further modification wherein the teeth of the movable cutter bar are obliquely disposed and wherein the opposing stationary teeth are staggered transversely of the head with respect to each other;

Figs. 19 and 20 are fragmentary, vertical, transverse sections taken on the lines 19—19 and 20—20 respectively of Fig. 18; and Fig. 21 is a fragmentary, vertical, longitudinal section taken on the line 21—21 of Fig. 18.

Referring to the construction shown in Figs. 1 to 9 inclusive of the drawings, the reference numeral 1 designates the casing of my improved electric shaver, the same serving as a handle, in which is housed an electric motor (not shown). A crosshead 1' formed on said casing serves as a support for a shaving head hereinafter described which is removably mounted therein. A rotatable cam disc 2, carried by the motor shaft, is permanently engaged by the forked end of a lever 3, which lever oscillates about on a fulcrum 4 that is anchored in said housing. The upper end 5 of said lever projects into a bottom recess 6, of oblong cross-section, formed on a reciprocatable cutter bar 7, which is elastically supported by spring-pressed pins 8 whose upper ends project into arcuate depressions or recesses 9 also formed on the bottom of said cutter bar.

The shaving head is composed of two essentially similar members 11, 11' and a machine screw 12 that projects through the member 11' and is tapped into the member 11 serves to firmly retain the opposing members 11, 11' together once the same have been assembled. End plates 13 are secured by screws 14 to both ends of each of the members 11, 11', the same having hair-scavenging apertures 13' therein.

The cutter bar 7 has two relatively shallow longitudinal slots 15 formed therein as well as a central longitudinal slot 15' which is of substantially greater depth than the other slots and these slots are adapted to receive guard bars 16, 16' whose top surfaces extend flush with the top surfaces of said cutter bar and function to prevent the entrance of the skin into slots in the cutter bar and between the hereinafter described teeth thereof. Said cutter bar has a series of parallel transverse slots 18 formed therein, the bottom a of which on either side of the center slopes downwardly and these slots, which project completely across said bar, intersect the aforesaid longitudinal slots 15, 15' thereby forming four longitudinal series of rectangular cutting teeth 19, 19'.

The upper portions of the respective members 11, 11' are also transversely slotted to form comb elements 20, 20' and the bottoms a' of these slots also slope downwardly from a center line at the same angle of slope as the bottoms a of the slots 18. The intermediate comb elements have offset top ends 21 while the terminal comb elements which extend upwardly slightly beyond the top of the former have offset top ends 21'. The lateral faces of the offset ends 21 and the top inner lateral faces of the terminal members 21', as designated by the numeral 22, are each beveled and ground to a sharp cutting edge along the bottom margin thereof, these edges being adapted to cooperate with the aforesaid cutting teeth 19 to effect the shearing of the hair from the skin of the user when the cutter bar 7 is caused to reciprocate within the razor head while the same is being drawn over the skin, in the manner customary when shaving, in order to admit hair to enter into said slots between the comb elements and into the path of reciprocation of the teeth on the cutter bar. A thumb screw 23 retains the shaving head in the handle or casing 1.

In the construction shown in Figs. 10 to 12, the opposing members 25, 25' of the shaving head are appropriately shaped to form, when assembled together, a slot 26 for the reception of the cutter bar 27 which latter has sloping bottom faces b intermediate the teeth thereof that are of the same angle of slope and in alignment with the sloping bottom faces b', b' of transverse slots in the respective members 25, 25', these sloping surfaces co-operating to form a chute or slide which admits of the ready scavenging of refuse hair from within the head during the shaving operation. Said cutter bar has a single central longitudinal groove 28 and parallel transverse slots 29 formed therein which serve to sub-divide the same at the top into a series of teeth 30 that are oppositely disposed on either side of the central slot 28. A longitudinal bar 31 is loosely fitted into the longitudinal slot 28, the same serving as a guard to prevent the entrance of the skin into the slots 29 during the shaving operation. The reference numerals 32 and 32' designate the comb elements on the members 25, 25' and these have offset upper ends 33, 33' which generally correspond to the above described members 21, 21' in the construction shown in Fig. 4. Each of said members or fingers on the respective halves 25, 25' of the shaving head are of identical size and shape and extend but half way across the top of the slot 26 where they abut each other.

In the modification illustrated in Figs. 13–17, wherein the cutter bar and skin guard bars are united together and a central horizontal hair-receiving slot is provided at the top of the comb, the reference numerals 35, 35' designate longitudinal skin guard bars which are rigidly secured in the reciprocatable cutter bar 7 by means of pins 36 each of which projects completely through the bars 35, 35' and is anchored in the cutter bar 7, with which they have a driven fit adjacent the respective ends thereof (see Fig. 17). The comb members 20, 20' are each provided with an abbreviated finger 37 of insufficient length to abut against an opposing finger carried by the other member of the shaving head, thereby affording a longitudinal central hair-receiving slot 38 which permits the entrance of hairs passing therethrough into the transverse slots 18 of the cutter bar. Each of said fingers is bevelled and ground along its lateral faces substantially throughout the length thereof, as indicated by the reference letter c, to form a sharp cutting edge and the end faces are also chamfered, as indicated by the reference letter c', to form a smooth sloping surface that facilitates the entrance of hairs into the central longitudinal slot 38 and the slots 18 during the shaving operation.

In the modification illustrated in Figs. 18–21, the opposing members 40, 40' of the shaving head are cut away so as to form, when assembled, a slot 41 to receive the cutter bar which latter is composed of two opposing members 42, 42' that are united together by means of a machine screw 43. Skin guard bars 45 are rigidly secured in longitudinal slots in said cutter bar by means of the transverse pins 46 and these bars intersect oblique slots 47, 47' which are flanked by teeth 48, 48' of rhomboid configuration. The members 40, 40' are transversely slotted at their upper ends, as indicated by the reference numeral 50, so as to form two series of comb fingers 51, staggered with respect to each other, whose lateral faces d are bevelled and ground to a sharp cutting edge. The cutting edges on the adjacent comb fingers diverge from the base to the tip thereof and thus facilitate the entrance of hair therebetween and into the central slot 52 which latter extends longitudinally of the head between the free ends of the comb fingers or elements on the members 40, 40'. As shown, these slots 50 extend through the lateral faces of the members 40, 40' and the side walls of said slots converge and meet at the bottom. These slots 50 serve as hair scavenging chutes.

I am well aware that razor constructions have been provided such for example as disclosed in Patent No. 1,721,530 wherein a shearing plate of extreme thinness was employed which was provided with slots extending all the way across, from edge to edge, such shearing plate being so thin as to positively require reinforcement by the cutter bar throughout its entire width to prevent the flexing thereof. While the employment of a thin shearing plate enables the relatively close cutting of the hairs that enter the slots thereof, nevertheless, in this patented construction it was imperative that the width of the slots in the shearing plate should be insufficient to admit the entrance of skin thereinto and the limit being usually not in excess of 10 thousandths of an inch in width. As a consequence, due to the relatively narrow slots in such shearing plate, the shaving operation with that type of razor is laborious as compared with the type described herein wherein a sturdy comb member is provided, the elements of which are spaced at a relatively great distance from each other so as to admit skin to enter into the very bottom of said slots, at which point the skin guards or guide members stop the further penetration of such skin and prevent any injury thereto. In my improved construction, the spacing between the opposing shearing edges of the adjacent comb elements or in other words, the width of the slots therebetween, preferably is about 21 thousandths of an inch which is more than double that previously thought possible to employ in electric razors having thin shear plates such as aforesaid and thereby the entrance of the hairs into said slots is greatly facilitated thus materially shortening the shaving operation besides insuring that a remarkably close shave can be accomplished due to the fact that the skin can penetrate right up to the plane where the cutting action between the cooperating shearing edges of the comb elements and the teeth of the cutter bar occurs. In no case should the skin guard bars extend either above or below the top surfaces of the teeth of the cutter bar and should lie essentially flush therewith, otherwise the skin will become objectionably irritated if not injured during the shaving operation.

The aforesaid elastic mounting of the cutter bar renders the cooperative stationary blades and the teeth of the cutter bars self-sharpening during the reciprocation of the cutter bar since as the skin guard bars or guides gradually wear down, the upper end faces of the teeth of the cutter bar will likewise gradually become ground or worn by grinding contact with the opposing stationary knife edges yet at the same time, due to the fact that the skin guard bars are flush with the top surfaces of such teeth, destructive impingement of any single tooth or of several teeth simultaneously against the edges of the stationary blades of the comb elements is wholly prevented.

In operation, when the circuit is closed through the electric motor in the usual manner, the rotation of the main shaft is effected and this in turn imparts motion to the cam disc 2 and the latter, acting through lever 3, imparts a reciprocating motion to the cutter bar so that when the instrument is moved to and fro with the comb thereof pressed against the face of the user, in the customary manner when shaving with an electric razor, the hairs will readily enter into the slots in the comb and are sheared off flush with the skin which, as above stated, can penetrate to, but not beyond, the very plane where the cutting action occurs.

In the construction illustrated in Figs. 1 to 12, wherein the skin guard guides are secured by means of the pins 17 to the ends of the shaving head, the cutter bar reciprocates in the slot 10 of the shaving head while the skin guard guides remain stationary whereas in the construction illustrated in Figs. 13–21, the skin guard guides being secured to the cutter bar by either the pins 36 or 46, the said cutter bar and skin guard bars reciprocate as a unit in the shaving head.

The teeth 48, 48' shown in the construction illustrated in Fig. 18 which extend obliquely across the axis of the cutter bar tend to shear off the hairs with a scissor-like motion particularly if the shearing edges of the faces d of the comb elements 51 are oppositely inclined as shown in Fig. 18.

While I have illustrated certain preferred embodiments of my invention herein, various changes from the construction shown may be made without departing from the spirit of my invention as embraced within the scope of the appended claims.

Having thus described my invention, what I claim and desire to obtain by United States Letters Patent is:

1. In an electrical razor, the combination comprising a shaving head, a longitudinally reciprocatable serrated cutter bar mounted therein, a plurality of co-operating stationary transversely disposed and longitudinally spaced comb elements carried by said shaving head and having opposed lateral shearing edges which are spaced a relatively great distance from each other, considerably in excess of 10 thousandths of an inch and sufficient to freely admit the entrance of the skin between such shearing edges during a shaving operation thereon if such entrance is otherwise unopposed and longitudinal guard means interconnecting adjacent cutter teeth whose top surface lies flush with the plane which includes the top faces of the cutter bar teeth, said guard means serving to restrict the area of the openings between adjacent shearing edges on the comb elements to prevent the penetration of such skin during a shaving operation thereon below the plane which includes such shearing edges and into the spaces between two successive teeth of such cutter.

2. In an electrical razor, the combination comprising a shaving head, a longitudinally reciprocatable serrated cutter bar mounted therein, a plurality of co-operating stationary transversely disposed and longitudinally spaced comb elements carried by said shaving head and having opposed lateral shearing edges which are spaced from each other a relatively great distance of about the order of 21 thousandths of an inch and longitudinal guard means interconnecting adjacent cutter teeth whose top surface lies flush with a plane that includes the top faces of the cutter bar teeth, said guard means serving to restrict the area of the openings between adjacent shearing edges of the comb elements to prevent the penetration of such skin during a shaving operation thereon below the plane which includes such shearing edges and into the spaces between two successive teeth of such cutter bar.

3. In an electrical razor, the combination comprising a shaving head, longitudinally reciprocatable cutter means mounted thereon, the same having two opposed, longitudinally extending series of transverse teeth, two series of co-operating spaced comb elements carried by said shaving head and having opposed lateral shearing edges, such elements being spaced longitudinally from each other a relatively great distance, considerably in excess of ten thousandths of an inch and sufficient to freely admit the entrance of skin between such shearing edges during a shaving operation thereon if such entrance is otherwise unopposed; and longitudinally extending guard members each interconnecting adjacent teeth of a different series thereof and whose top surface lies flush with the plane which includes the top faces of such teeth, each guard member serving to restrict the area of the openings between adjacent shearing edges of such comb elements to prevent the penetration of such skin during a shaving operation thereon below the plane which includes such shearing edges and into the spaces between the successive teeth of the same series thereof.

JAMES DOBSON ALTEMUS.